(12) United States Patent
Atmur

(10) Patent No.: US 11,349,316 B2
(45) Date of Patent: May 31, 2022

(54) SYSTEM AND METHOD FOR CONTROLLING A HIGH-VOLTAGE BATTERY SYSTEM

(71) Applicant: The Boeing Company, Chicago, IL (US)

(72) Inventor: Robert J. Atmur, Whittier, CA (US)

(73) Assignee: THE BOEING COMPANY, Chicago, IL (US)

( * ) Notice: Subject to any disclaimer, the term of this patent is extended or adjusted under 35 U.S.C. 154(b) by 149 days.

(21) Appl. No.: 16/852,879

(22) Filed: Apr. 20, 2020

(65) Prior Publication Data

US 2021/0328439 A1    Oct. 21, 2021

(51) Int. Cl.
*H02J 7/00*     (2006.01)
*H01M 10/42*    (2006.01)

(52) U.S. Cl.
CPC ......... *H02J 7/0013* (2013.01); *H01M 10/425* (2013.01); *H01M 10/4207* (2013.01); *H01M 2010/4271* (2013.01)

(58) Field of Classification Search
USPC ....................................................... 320/116
See application file for complete search history.

(56) References Cited

U.S. PATENT DOCUMENTS

| | | | |
|---|---|---|---|
| 7,038,426 B2 | 5/2006 | Hall | |
| 9,157,827 B1 | 10/2015 | Tillotson | |
| 10,414,358 B2 | 9/2019 | Macaraeg | |
| 10,445,449 B2 | 10/2019 | Cox et al. | |
| 2012/0043924 A1* | 2/2012 | Sheahan, Jr. | ....... H01M 10/425 320/107 |
| 2016/0028128 A1* | 1/2016 | Limvorapun | ..... H01M 10/6555 429/62 |
| 2019/0027952 A1* | 1/2019 | Saito | .................... H02J 7/0072 |

FOREIGN PATENT DOCUMENTS

| | | |
|---|---|---|
| EP | 3588733 A1 | 1/2020 |
| FR | 2959631 A1 | 11/2011 |

OTHER PUBLICATIONS

Braccini, Roberto (EP Examiner), Extended European Search Report dated Jun. 8, 2021 in corresponding European Application No. 21153551.3, 9 pages.

* cited by examiner

*Primary Examiner* — Mohammed Alam
(74) *Attorney, Agent, or Firm* — MH2 Technology Law Group LLP

(57) ABSTRACT

A circuit for controlling a battery includes a switch. The switch includes a source, a gate, and a drain. The drain of the switch is configured to be connected to a positive terminal of the battery. The circuit also includes a first diode. The first diode includes an anode and a cathode. The anode of the first diode is connected to the source of the switch. The cathode of the first diode is connected to the drain of the switch and is configured to be connected to the positive terminal of the battery. The circuit also includes a second diode. The second diode includes an anode and a cathode. The anode of the second diode is configured to be connected to a negative terminal of the battery. The cathode of the second diode is connected to the source of the switch and to the anode of the first diode.

15 Claims, 3 Drawing Sheets

SYSTEM AND METHOD FOR CONTROLLING A HIGH-VOLTAGE BATTERY SYSTEM

FIELD OF THE DISCLOSURE

The present disclosure is directed to systems and methods for controlling a high-voltage battery system. More particularly, the present disclosure is directed to systems and methods for safely turning a high-voltage battery system on and off.

BACKGROUND

Currently, high-voltage battery systems are built around a single high-voltage core with solid state or mechanical disconnects built to withstand the high voltages and high currents. Due to the high voltage of the core, manufacturing conventional battery systems requires a unique system to assembly the core, handle the core safely, install the core into the battery, and connect to and monitor the individual cells for a balanced operation.

SUMMARY

A circuit for controlling a battery is disclosed. The circuit includes a switch. The switch includes a source, a gate, and a drain. The drain of the switch is configured to be connected to a positive terminal of the battery. The circuit also includes a first diode. The first diode includes an anode and a cathode. The anode of the first diode is connected to the source of the switch. The cathode of the first diode is connected to the drain of the switch and is configured to be connected to the positive terminal of the battery. The circuit also includes a second diode. The second diode includes an anode and a cathode. The anode of the second diode is configured to be connected to a negative terminal of the battery. The cathode of the second diode is connected to the source of the switch and to the anode of the first diode. The circuit is configured to switch the battery on and off.

A battery system is also disclosed. The battery system includes a first circuit. The first circuit includes a first switch having a source, a gate, and a drain. The first circuit also includes a second switch having a source, a gate, and a drain. The first circuit also includes a third switch having a source, a gate, and a drain. The sources of the first, second, and third switches are connected to one another, and the drains of the first, second, and third switches are connected to one another, such that the first, second, and third switches are in parallel with one another. The first circuit also includes a first diode having an anode and a cathode. The anode of the first diode is connected to the source of the first switch, and the cathode of the first diode is connected to the drain of the first switch. The first circuit also includes a second diode having an anode and a cathode. The anode of the second diode is connected to the source of the second switch, and the cathode of the second diode is connected to the drain of the second switch. The first circuit also includes a third diode having an anode and a cathode. The anode of the third diode is connected to the source of the third switch, and the cathode of the third diode is connected to the drain of the third switch. The first circuit also includes a fourth diode having an anode and a cathode. The cathode of the fourth diode is connected to the sources of the first, second, and third switches and to the anodes of the first, second, and third diodes. The battery system also includes a first battery having a positive terminal and a negative terminal. The positive terminal is configured to be connected to the drains of the first, second, and third switches, the cathodes of the first, second, and third diodes, or a combination thereof. The negative terminal is configured to be connected to the anode of the fourth diode. The first circuit is configured to turn the first battery on and off.

A method is also disclosed. The method includes connecting a first circuit to a first battery to produce a first battery assembly. The first circuit includes a switch having a source, a gate, and a drain. Connecting the first circuit to the first battery includes connecting the drain of the switch of the first circuit to a positive terminal of the first battery. The first circuit also includes a first diode having an anode and a cathode. The anode of the first diode of the first circuit is connected to the source of the switch of the first circuit. The cathode of the first diode of the first circuit is connected to the drain of the switch of the first circuit. Connecting the first circuit to the first battery includes connecting the cathode of the first diode of the first circuit to the positive terminal of the first battery. The first circuit also includes a second diode having an anode and a cathode. Connecting the first circuit to the first battery includes connecting the anode of the second diode of the first circuit to a negative terminal of the first battery. The cathode of the second diode of the first circuit is connected to the source of the switch of the first circuit and to the anode of the first diode of the first circuit. The method also includes connecting a second circuit to a second battery to produce a second battery assembly. The second circuit includes a switch having a source, a gate, and a drain. Connecting the second circuit to the second battery includes connecting the drain of the switch of the second circuit to a positive terminal of the second battery. The second circuit also includes a first diode having an anode and a cathode. The anode of the first diode of the second circuit is connected to the source of the switch of the second circuit. The cathode of the first diode of the second circuit is connected to the drain of the switch of the second circuit. Connecting the second circuit to the second battery includes connecting the cathode of the first diode of the second circuit to the positive terminal of the second battery. The second circuit also includes a second diode having an anode and a cathode. Connecting the second circuit to the second battery includes connecting the anode of the second diode of the second circuit to a negative terminal of the second battery. The cathode of the second diode of the second circuit is connected to the source of the switch of the second circuit and to the anode of the first diode of the second circuit. The method also includes connecting the first battery assembly to the second battery assembly in series. The method also includes connecting the first battery assembly to a load and to a capacitor. The load and the capacitor are connected in parallel. The method also includes connecting the second battery assembly to the load and to the capacitor. The method also includes switching the first battery assembly on. The method also includes switching the second battery assembly on before or after the first battery assembly is switched on.

BRIEF DESCRIPTION OF THE DRAWINGS

The accompanying drawings, which are incorporated in and constitute a part of this specification, illustrate aspects of the present teachings and together with the description, serve to explain the principles of the present teachings.

Figure 1:
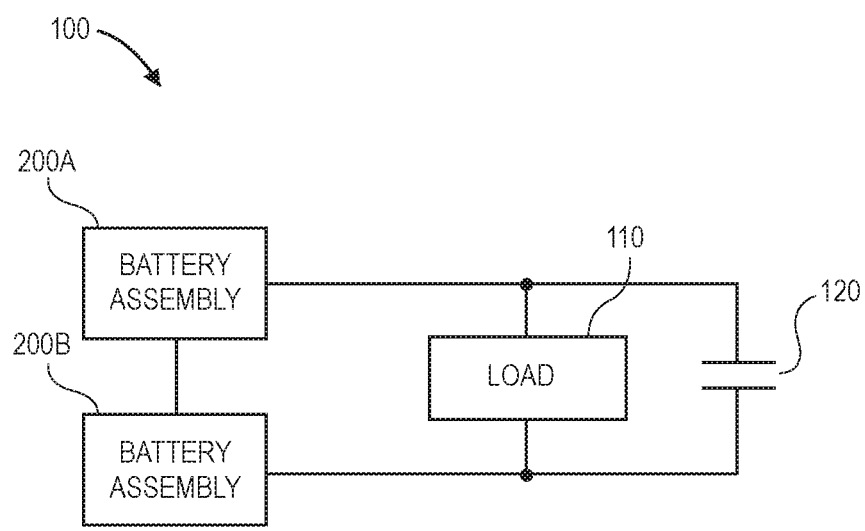
FIG. 1 illustrates a schematic view of a battery system, according to an implementation.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

The present disclosure is directed to a system and method for controlling a high-voltage battery system. The system and method include a plurality of batteries that are turned on in sequence, which causes the power supplied to a load to gradually increase, allowing a conventional pre-charging circuit to be omitted. In addition, a diode may be connected in parallel with each battery, which facilitates turning the batteries on one at a time. This system and method represents a reduction in energy during the electrical current inrush as the batteries are turned on. When the high-voltage battery system is turned off, the electrical current may stop flowing through the batteries and shunt to the diodes. As the inductive current is supported by the diode, the batteries can safely be turned off.

FIG. 1 illustrates a schematic view of a battery system 100, according to an implementation. The battery system 100 may include one or more battery assemblies (two are shown: 200A, 200B) that are configured to be connected to, and to provide electrical power to, a load 110. The load 110 may be or include a constant-power load, a resistive load, a reactive load, or a combination thereof. For example, the load 110 may be or include a resistive heater, an inductive heater, a motor controller, switch mode power supplies, a larger capacitor bank used as voltage bus support, or the like.

In at least one implementation, the battery assemblies 200A, 200B may also be connected to a capacitor (e.g., bus capacitance) 120. The capacitor 120 may be connected in parallel with the load 110. The capacitor 120 may be or include a primary bus support capacitance sized to manage a bus voltage ripple produced by large transient loads (e.g., the load 110 and/or the capacitor 120). For example, a bus voltage ripple may be produced by a large transient load when providing high bandwidth (e.g., >4 Hz) motor speed control with high load inertia acceleration and de-acceleration present large current transients to the primary voltage bus. Without significant bulk capacitance, the bus voltage ripple will become unacceptable. The capacitor 120 may have a capacitance value from about 1000 µF to about 5000 µF or preferably about 2000 µF to about 4000 µF, which may reduce the bus voltage ripple. The capacitance value may be selected to be proportional to the voltage minimum and the maximum transient limit. The DC bus has a physical extent, and that forces inductance into the circuit between the DC voltage source and the various loads. When the loads rapidly change their current demand from the bus, without capacitance, the bus voltage may rise or fall uncontrollably, potentially resulting in overvoltage or under voltage condition that would be detrimental to the load electronics. The magnitude of the support capacitance limits the rise and fall of the bus voltage to a value within the operating range of the load electronics. The value is proportional to the inductance between the source and load and the maximum current change.

Although two battery assemblies 200A, 200B are shown, it will be appreciated that the number of battery assemblies may vary depending upon the properties of the load 110 and the properties of the capacitor 120. As shown, the battery assemblies 200A, 200B are connected in series. In another implementation, the battery assemblies 200A, 200B may be connected in parallel, or a combination of series and parallel, depending upon the properties of the load 110, the properties of the capacitor 120, the number and properties of the battery assemblies 200A, 200B, or a combination thereof.

Figure 2:
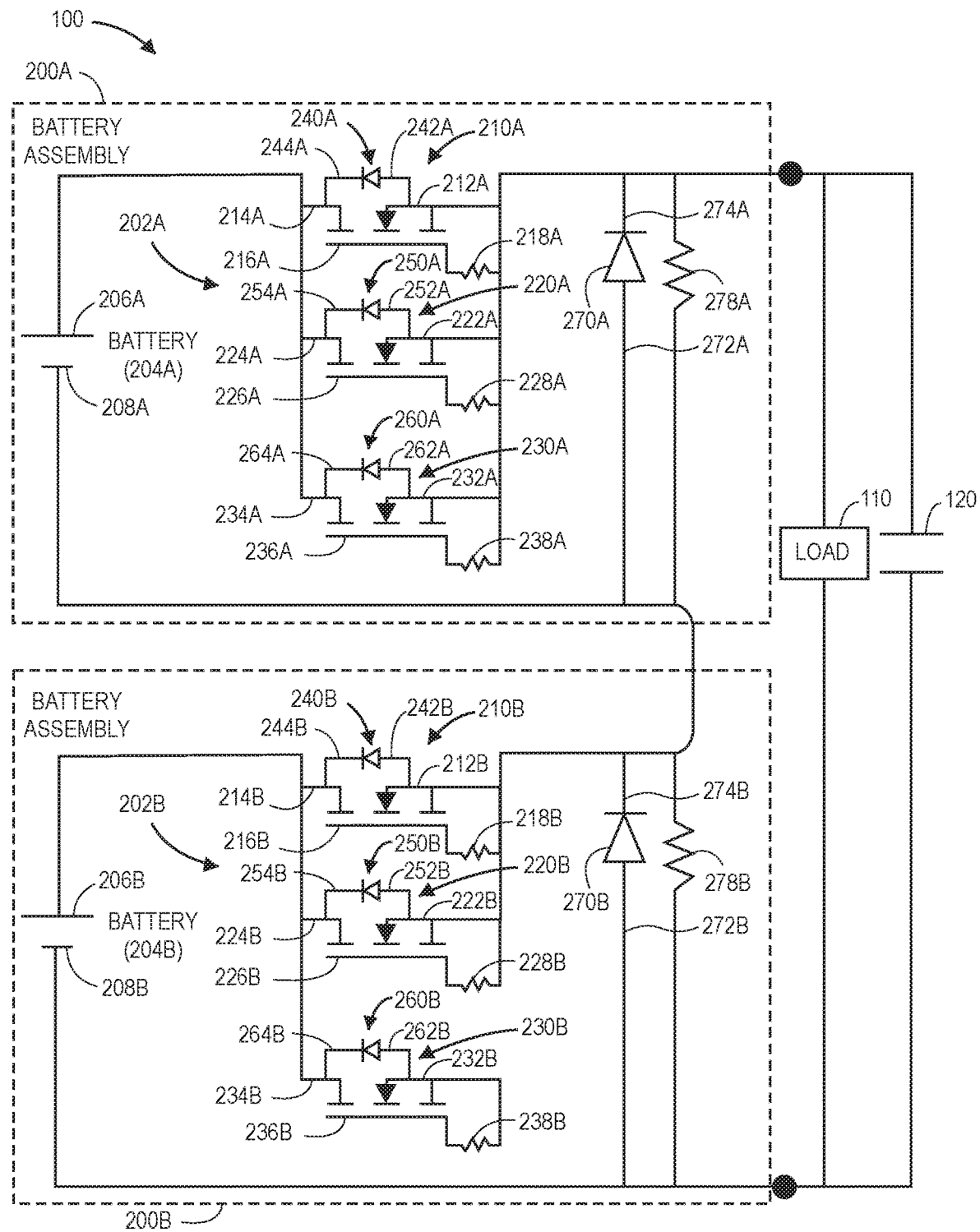
FIG. 2 illustrates a more detailed schematic view of the battery system, according to an implementation.

FIG. 2 illustrates a more detailed schematic view of the battery system 100, according to an implementation. The first battery assembly 200A may include a first circuit 202A and a first battery 204A. The first circuit 202A is configured to connect to the first battery 204A. As described in greater detail below, the first circuit 202A may be used to turn the first battery 204A on and off in a controlled manner. The first circuit 202A is configured to operate between about 28 V and about 64 V and between about 100 A and about 200 A.

The first circuit 202A may include one or more switches (three are shown: 210A, 220A, 230A). The switches 210A, 220A, 230A may be or include field-effect transistors (FETs) such as MOSFETs. More particularly, the first switch 210A may include a source 212A, a gate 214A, and a drain 216A, the second switch 220A may include a source 222A, a gate 224A, and a drain 226A, and the third switch 230A may include a source 232A, a gate 234A, and a drain 236A. The switches 210A, 220A, 230A may be connected in parallel with one another. For example, the sources 212A, 222A, 232A may be connected together, and the drains 216A, 226A, 236A may be connected together. The switches 210A, 220A, 230A may have an isolation voltage from about 2000 volts to about 2500 volts.

Each switch 210A, 220A, 230A may have a diode 240A, 250A, 260A connected thereto. The first diode 240A may have an anode 242A and a cathode 244A, the second diode 250A may have an anode 252A and a cathode 254A, and the third diode 260A may have an anode 262A and a cathode 264A. The diodes 240A, 250A, 260A may be connected in parallel with one another. For example, the anodes 242A, 252A, 262A may be connected together, and the cathodes 244A, 254A, 264A may be connected together.

In the implementation shown, the switches 210A, 220A, 230A may be connected in parallel with the diodes 240A, 250A, 260A. For example, the source 212A of the first switch 210A may be connected to the anode 242A of the first diode 240A, the source 222A of the second switch 220A may be connected to the anode 252A of the second diode 250A, and the source 232A of the third switch 230A may be connected to the anode 262A of the third diode 260A. As shown, the sources 212A, 222A, 232A and the anodes 242A, 252A, 262A may be connected together, and the drains 216A, 226A, 236A and the cathodes 244A, 254A, 264A may be connected together.

Each switch 210A, 220A, 230A may have one or more resistors connected thereto. More particularly, the gate 214A of the first switch 210A may have a first resistor 218A connected thereto, the gate 224A of the second switch 220A may have a second resistor 228A connected thereto, and the gate 234A of the third switch 230A may have a third resistor 238A connected thereto. The resistors 218A, 228A, 238A may be connected in parallel with one another. For example, the resistors 218A, 228A, 238A may be connected to one another, to the sources 212A, 222A, 232A, and/or to the anodes 242A, 252A, 262A. The resistors 218A, 228A, 238A may have resistance values from about 10 kΩ to about 100 kΩ.

The first circuit 202A may also include a fourth diode 270A that is connected to the switches 210A, 220A, 230A and/or to the diodes 240A, 250A, 260A. More particularly, a cathode 274A of the fourth diode 270A may be connected to the sources 212A, 222A, 232A and to the anodes 242A, 252A, 262A.

The first circuit 202A may also include a fourth resistor 278A that is connected in parallel with the fourth diode 270A. More particularly, a first side of the fourth resistor 278A may be connected to the sources 212A, 222A, 232A, to the anodes 242A, 252A, 262A, and to the cathode 274A. The fourth resistor 278A may have a resistance value from about 10 kΩ to about 100 kΩ.

As mentioned above, the first circuit 202A may be connected to the first battery 204A. More particularly, the drains 216A, 226A, 236A and/or the cathodes 244A, 254A, 264A may be connected to a positive terminal 206A of the first battery 204A. The anode 272A of the fourth diode 270A and/or a second side of the fourth resistor 278A may be connected to a negative terminal 208A of the first battery 204A.

The first circuit 202A may be configured to connect to the load 110 and/or the capacitor 120. More particularly, the sources 212A, 222A, 232A, the anodes 242A, 252A, 262A, the cathode 274A, the resistors 218A, 228A, 238A, 278A, or a combination thereof may be connected to a first side of the load 110 and/or a first side of the capacitor 120.

As shown, the second battery assembly 200B may be similar to the first battery assembly 200A; however, in other implementations, it may be different. The second battery assembly 200B may include a second circuit 202B and a second battery 204B. The second circuit 202B is configured to connect to the second battery 204B. The second circuit 202B may be similar to the first circuit 202A; however, in other implementations, it may be different. The second circuit 202B is configured to operate between about 28 V and about 64 V and between about 100 A and about 200 A.

As shown, the second circuit 202B may include a first switch 210B, a second switch 220B, and a third switch 230B. The first switch 210B may include a source 212B, a gate 214B, and a drain 216B. The second switch 220B may include a source 222B, a gate 224B, and a drain 226B. The third switch 230B may include a source 232B, a gate 234B, and a drain 236B.

The second circuit 202B may also include a first diode 240B, a second diode 250B, a third diode 260B, and a fourth diode 270B. The first diode 240B may include an anode 242B and a cathode 244B. The second diode 250B may include an anode 252B and a cathode 254B. The third diode 260B may include an anode 262B and a cathode 264B. The fourth diode 270B may include an anode 272B and a cathode 274B. The second circuit 202B may also include resistors 218B, 228B, 238B, 278B.

The second circuit 202B may be configured to connect to the load 110 and/or the capacitor 120. More particularly, the anode 272B of the fourth diode 270B and/or second side the resistor 278B may be connected to a second side of the load 110 and/or a second side of the capacitor 120.

As mentioned above, the first battery assembly 200A may be connected to the second battery assembly 200B. For example, the anode 272A, the fourth resistor 278A, and/or the negative terminal 208A of the first battery 204A may be connected to the sources 212B, 222B, 232B, the anodes 242B, 252B, 262B, the resistors 218B, 228B, 238B, 278A, the cathode 274B, or a combination thereof. As mentioned above, two battery assemblies 200A, 200B are shown in FIGS. 1 and 2 for simplicity; however, one or more additional battery assemblies may be added to the system 100 (e.g., in series) depending at least partially upon the size and/or properties of the load 110, the size and/or properties of the capacitor 120, the size, number, and properties of the battery assemblies 200A, 200B, or a combination thereof.

Figure 3:
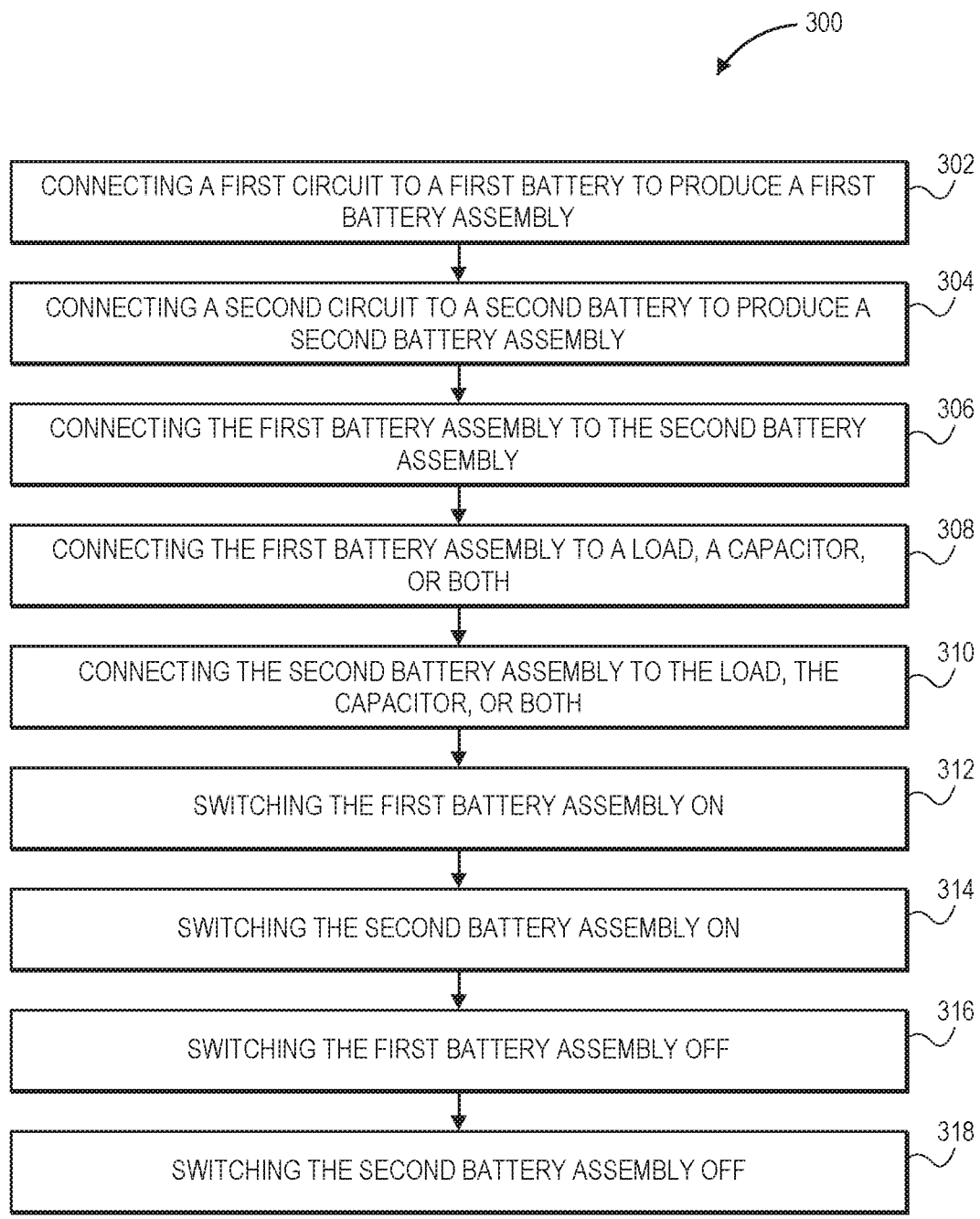
FIG. 3 illustrates a flowchart of a method for controlling the battery system, according to an implementation.

FIG. 3 illustrates a flowchart of a method 300 for controlling the battery system 100, according to an implementation. More particularly, the method 300 may be used to control the first circuit 202A in the first battery assembly 200A, the second circuit 202B in the second battery assembly 200B, or a combination thereof. An illustrative order of the method 300 is provided below; however, one or more steps of the method 300 may be performed in a different order, repeated, or omitted altogether.

The method 300 may include connecting the first circuit 202A to the first battery 204A to produce the first battery assembly 200A, as at step 302. As mentioned above, connecting the first circuit 202A to the first battery 204A may include connecting the drains 216A, 226A, 236A, the cathodes 244A, 254A, 264A, or a combination thereof to the positive terminal 206A of the first battery 204A. Connecting the first circuit 202A to the first battery 204A may also include connecting the anode 272A and/or the resistor 278A to the negative terminal 208A of the first battery 204A.

The method 300 may also include connecting the second circuit 202B to the second battery 204B to produce the second battery assembly 200B, as at step 304. As mentioned above, connecting the second circuit 202B to the second battery 204B may include connecting the drains 216B, 226B, 236B, the cathodes 244B, 254B, 264B, or a combination thereof to the positive terminal 206B of the second battery 204B. Connecting the second circuit 202B to the second battery 204B may also include connecting the anode 272B and/or the resistor 278B to the negative terminal 208B of the second battery 204B.

The method 300 may also include connecting the first battery assembly 200A to the second battery assembly 200B, as at step 306. This may include connecting the negative terminal 208A, the anode 272A, the resistor 278A, or a combination thereof of the first battery assembly 200A to the sources 212B, 222B, 232B, the anodes 242B, 252B, 262B, the cathode 274B, the resistors 218A, 228A, 238A, 278A, or a combination thereof of the second battery assembly 200B.

The method 300 may also include connecting the first battery assembly 200A to the load 110, the capacitor 120, or both, as at step 308. This may include connecting the sources 212A, 222A, 232A, the anodes 242A, 252A, 262A, the cathode 274A, the resistors 218A, 228A, 238A, 278A, or a combination thereof of the first battery assembly 200A to a first side of the load 110, a first side of the capacitor 120, or both.

The method 300 may also include connecting the second battery assembly 200B to the load 110, the capacitor 120, or both, as at step 310. This may include connecting the anode 272B, the resistor 278B, the negative terminal 208B of the second battery 204B or a combination thereof of the second battery assembly 200B to a second side of the load 110, a second side of the capacitor 120, or both.

The method 300 may also include switching the first battery assembly 200A on, as at step 312. This may include switching the first battery 204A on using the first circuit 202A. For example, this may include switching the switches 210A, 220A, 230A into a first (e.g., on) state. This may generate a voltage across the load 110 and/or the capacitor 120 that causes an electrical current to flow into, through, and/or across the load 110 and/or the capacitor 120. In an example, the first battery 204A may generate about 45.1 V and about 300 A.

The method 300 may also include switching the second battery assembly 200B on, as at step 314. The second battery assembly 200B may be switched on after the first battery assembly 200A is switched on. However, in another implementation, the order may be reversed, and the second battery assembly 200B may be switched on prior to the first battery assembly 200A being switched on. Switching the second battery assembly 200B on may include switching the second battery 204B on using the second circuit 202B. For example, this may include switching the switches 210B, 220B, 230B into the first (e.g., on) state. This may generate a voltage across the load 110 and/or the capacitor 120 that causes an electrical current to flow into, through, and/or across the load 110 and/or the capacitor 120. In an example, the second battery 204B may also generate about 45.1 V and about 300 A.

One or more additional battery assemblies may also be switched on sequentially. Continuing with the example above, ten battery assemblies (e.g., 200A, 200B, etc.) may be connected in series and turned on sequentially to generate a voltage of about 450 V. Thus, standard charging systems may be used, no unsafe voltage is present, and an isolation fault presents only low voltage.

In contrast, a conventional battery system may include ten battery assemblies that may be connected in parallel and turned on simultaneously. Each of the battery assemblies in the conventional battery system may generate about 426 V and about 30 A. Thus, the conventional battery system may generate about the same voltage and current; however, application-specific charging systems may be used, special safety and handling procedures should be used due to the higher voltages and currents, and an isolation fault presents high (e.g., unsafe) voltage. As used herein, low voltage and/or safe voltage refers to less than or equal to about 50 V, and high-voltage and/or unsafe voltage refers to greater than or equal to about 100 V.

In addition, while the conventional battery system may require a pre-charging circuit to limit the rate at which the electrical current is introduced to the switch(es), the battery system 100 may operate without a pre-charging circuit because the electrical power gradually builds due to the sequential switching of the battery assemblies 200A, 200B. The total energy required to charge the bus capacitance (e.g., capacitor 120) is proportional to the square of the voltage applied to the capacitor 120. Pre-charge circuits extend the time that energy is allowed to build-up, reducing the load on the switching elements (e.g., switches 210A, 220A, 230A). Sequencing the batteries 204A, 204B on one after another performs the same function as a pre-charge circuit without the addition of a pre-charge circuit, dissipative elements, and control functions. If a pre-charge circuit fails, this may cascade failures to the primary battery disconnections, resulting in a high-voltage failure in the battery system 100. Using only a small fraction of the total voltage in each step (e.g., when turning on each battery 204A, 204B) reduces the total energy of the charge step to ~1%, allowing the pre-charging circuits to be omitted. This low energy is well within the safe operating area of the solid state switches (e.g., switches 210A, 220A, 230A) in this battery system 100.

The method 300 may also include switching the first battery assembly 200A off, as at step 316. This may include switching the first battery 204A off using the first circuit 202A. For example, this may include switching the switches 210A, 220A, 230A into a second (e.g., off) state.

The method 300 may also include switching the second battery assembly 200B off, as at step 318. This may include switching the second battery 204B off using the second circuit 202B. For example, the second circuit 202B may switch the second battery 204B off by switching the switches 210B, 220B, 230B into the second (e.g., off) state. The second battery assembly 200B may be switched off after the first battery assembly 200A is switched off. However, in another implementation, the order may be reversed, and the second battery assembly 200B may be switched off prior to the first battery assembly 200A being switched off.

When the first battery assembly 200A and/or the second battery assembly 200B is/are switched off, at least a portion of the electrical current may be diverted through the diode(s) 270A, 270B. This may have the benefit of eliminating inductive kick back voltage. This voltage occurs when the rate of change of the electrical current is high (e.g., greater than about 50 A, greater than about 100 A, greater than about 200 A, etc.), by allowing the current to flow through the diode the rate of change reduces slowly because it is not blocked as in typical applications.

As used herein, the terms "inner" and "outer"; "up" and "down"; "upper" and "lower"; "upward" and "downward"; "upstream" and "downstream"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. As used herein, the terms "a", "an", and "the" may refer to one or more elements or parts of elements. As used herein, the terms "first" and "second" may refer to two different elements or parts of elements. As used herein, the term "at least one of A and B" with respect to a listing of items such as, for example, A and B, means A alone, B alone, or A and B. Those skilled in the art will recognize that these and other variations are possible. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A battery system, comprising:
    a first circuit comprising:
        a first switch comprising a source, a gate, and a drain;
        a second switch comprising a source, a gate, and a drain;
        a third switch comprising a source, a gate, and a drain, wherein the sources of the first, second, and third switches are connected to one another, and the drains of the first, second, and third switches are connected to one another, such that the first, second, and third switches are in parallel with one another;
        a first diode comprising an anode and a cathode, wherein the anode of the first diode is connected to the source of the first switch, and wherein the cathode of the first diode is connected to the drain of the first switch;
        a second diode comprising an anode and a cathode, wherein the anode of the second diode is connected to the source of the second switch, and wherein the cathode of the second diode is connected to the drain of the second switch;
        a third diode comprising an anode and a cathode, wherein the anode of the third diode is connected to the source of the third switch, and wherein the cathode of the third diode is connected to the drain of the third switch; and
        a fourth diode comprising an anode and a cathode, wherein the cathode of the fourth diode is connected to the sources of the first, second, and third switches and to the anodes of the first, second, and third diodes; and
    a first battery comprising a positive terminal and a negative terminal, wherein the positive terminal is configured to be connected to the drains of the first, second, and third switches, the cathodes of the first, second, and third diodes, or a combination thereof, wherein the negative terminal is configured to be connected to the anode of the fourth diode, and wherein the first circuit is configured to turn the first battery on and off.

2. The battery system of claim 1, further comprising a first resistor comprising a first end connected to the gate of the first switch, and a second end connected to the source of the first switch, the anode of the first diode, and the cathode of the fourth diode, wherein the first resistor has a resistance from about 10 kΩ to about 100 kΩ.

3. The battery system of claim 2, further comprising:
    a second resistor comprising a first end connected to the gate of the second switch, and a second end connected to the source of the second switch, the anode of the second diode, and the cathode of the fourth diode, wherein the second resistor has a resistance from about 10 kΩ to about 100 kΩ; and
    a third resistor comprising a first end connected to the gate of the third switch, and a second end connected to the source of the third switch, the anode of the third diode, and the cathode of the fourth diode, wherein the third resistor has a resistance from about 10 kΩ to about 100 kΩ.

4. The battery system of claim 3, further comprising a fourth resistor comprising a first end and a second end, wherein the first end of the fourth resistor is connected to the sources of the first, second, and third switches, to the anodes of the first, second, and third diodes, and to the cathode of the fourth diode, wherein the second end of the fourth resistor is connected to the anode of the fourth diode and is configured to be connected to the negative terminal of the battery, and wherein the fourth resistor has a resistance from about 10 kΩ to about 100 kΩ.

5. The battery system of claim 4, wherein the first circuit is configured to operate between about 28 volts and about 64 volts and between about 300 amps and about 600 amps.

6. The battery system of claim 4, wherein each of the first, second, and third switches comprises an isolation voltage from about 2000 volts to about 2500 volts.

7. The battery system of claim 1, further comprising:
    a second circuit connected to the first circuit, the second circuit comprising:
        a first switch comprising a source, a gate, and a drain;
        a second switch comprising a source, a gate, and a drain;
        a third switch comprising a source, a gate, and a drain, wherein the sources of the first, second, and third switches of the second circuit are connected to one another, and the drains of the first, second, and third switches of the second circuit are connected to one another, such that the first, second, and third switches of the second circuit are in parallel with one another;
        a first diode comprising an anode and a cathode, wherein the anode of the first diode of the second circuit is connected to the source of the first switch of the second circuit, and wherein the cathode of the first diode of the second circuit is connected to the drain of the first switch of the second circuit;
        a second diode comprising an anode and a cathode, wherein the anode of the second diode of the second circuit is connected to the source of the second switch of the second circuit, and wherein the cathode of the second diode of the second circuit is connected to the drain of the second switch of the second circuit;
        a third diode comprising an anode and a cathode, wherein the anode of the third diode of the second circuit is connected to the source of the third switch of the second circuit, and wherein the cathode of the third diode of the second circuit is connected to the drain of the third switch of the second circuit; and
        a fourth diode comprising an anode and a cathode, wherein the cathode of the fourth diode of the second circuit is connected to the sources of the first, second, and third switches of the second circuit and to the anodes of the first, second, and third diodes of the second circuit; and
    a second battery comprising a positive terminal and a negative terminal, wherein the positive terminal of the second battery is configured to be connected to the drains of the first, second, and third switches of the second circuit, the cathodes of the first, second, and third diodes of the second circuit, or a combination thereof, wherein the negative terminal of the second battery is configured to be connected to the anode of the fourth diode of the second circuit, and wherein the second circuit is configured to turn the second battery on and off.

8. The battery system of claim 7, wherein the anode of the fourth diode of the first circuit and the negative terminal of the first battery are connected to the cathode of the fourth diode of the second circuit, the sources of the first, second, and third switches of the second circuit, and the anodes of the first, second, and third diodes of the second circuit.

9. The battery system of claim 8, wherein the first circuit and the second circuit are configured to connect to a load and to a capacitor.

10. The battery system of claim 9, wherein the first, second, and third switches of the first circuit and the cathode of the fourth diode of the first circuit are configured to connect to a first side of the load and a first side of the capacitor, and wherein the anode of the fourth diode of the second circuit and the negative terminal of the second battery are configured to connect to a second side of the load and a second side of the capacitor.

11. A method, comprising:
connecting a first circuit to a first battery to produce a first battery assembly, wherein the first circuit comprises:
- a switch comprising a source, a gate, and a drain, wherein connecting the first circuit to the first battery comprises connecting the drain of the switch of the first circuit to a positive terminal of the first battery;
- a first diode comprising an anode and a cathode, wherein the anode of the first diode of the first circuit is connected to the source of the switch of the first circuit, wherein the cathode of the first diode of the first circuit is connected to the drain of the switch of the first circuit, and wherein connecting the first circuit to the first battery comprises connecting the cathode of the first diode of the first circuit to the positive terminal of the first battery; and
- a second diode comprising an anode and a cathode, wherein connecting the first circuit to the first battery comprises connecting the anode of the second diode of the first circuit to a negative terminal of the first battery, wherein the cathode of the second diode of the first circuit is connected to the source of the switch of the first circuit and to the anode of the first diode of the first circuit;

connecting a second circuit to a second battery to produce a second battery assembly, wherein the second circuit comprises:
- a switch comprising a source, a gate, and a drain, wherein connecting the second circuit to the second battery comprises connecting the drain of the switch of the second circuit to a positive terminal of the second battery;
- a first diode comprising an anode and a cathode, wherein the anode of the first diode of the second circuit is connected to the source of the switch of the second circuit, wherein the cathode of the first diode of the second circuit is connected to the drain of the switch of the second circuit, and wherein connecting the second circuit to the second battery comprises connecting the cathode of the first diode of the second circuit to the positive terminal of the second battery; and
- a second diode comprising an anode and a cathode, wherein connecting the second circuit to the second battery comprises connecting the anode of the second diode of the second circuit to a negative terminal of the second battery, and wherein the cathode of the second diode of the second circuit is connected to the source of the switch of the second circuit and to the anode of the first diode of the second circuit;

connecting the first battery assembly to the second battery assembly in series;
connecting the first battery assembly to a load and to a capacitor, wherein the load and the capacitor are connected in parallel;
connecting the second battery assembly to the load and to the capacitor;
switching the first battery assembly on; and
switching the second battery assembly on before or after the first battery assembly is switched on.

12. The method of claim 11, wherein connecting the first battery assembly to the second battery assembly comprises connecting the negative terminal of the first battery and the anode of the second diode of the first circuit to the source of the switch of the second circuit, the anode of the first diode of the second circuit, and the cathode of the second diode of the second circuit.

13. The method of claim 12, wherein connecting the first battery assembly to the load and to the capacitor comprises connecting the source of the switch of the first circuit, the anode of the first diode of the first circuit, and the cathode of the second diode of the first circuit to a first side of the load and to a first side of the capacitor, and wherein connecting the second battery assembly to the load and to the capacitor comprises connecting the negative terminal of the second battery and the anode of the second diode of the second circuit to a second side of the load and to a second side of the capacitor.

14. The method of claim 13, wherein switching the first battery assembly on comprises switching the switch of the first circuit into an on state to cause the first battery to supply power to the load without using a pre-charge circuit.

15. The method of claim 14, further comprising:
switching the first battery assembly off; and
switching the second battery assembly off before or after switching the first battery assembly off, thereby causing at least a portion of an electrical current flowing through the first and second batteries to be diverted and flow through the second diode of the first circuit and the second diode of the second circuit.

* * * * *